United States Patent [19]

Kuwabara et al.

[11] Patent Number: 5,111,332
[45] Date of Patent: May 5, 1992

[54] METHOD OF AND APPARATUS FOR CONTROLLING DEFLECTION OF OPTICAL BEAMS

[75] Inventors: Akira Kuwabara; Eiichi Tamaki; Yasufumi Koyama, all of Kyoto, Japan

[73] Assignee: Dainippon Screen Mfg. Co., Ltd., Kyoto, Japan

[21] Appl. No.: 642,764

[22] Filed: Jan. 18, 1991

[30] Foreign Application Priority Data

Jan. 26, 1990 [JP] Japan .................................. 2-17553

[51] Int. Cl.$^5$ ........................... G02F 1/11; G02F 1/33
[52] U.S. Cl. ................................. 359/307; 359/305
[58] Field of Search ................. 350/358; 359/305, 307

[56] References Cited

U.S. PATENT DOCUMENTS

| | | | |
|---|---|---|---|
| 4,367,926 | 1/1983 | Hohki | 350/358 |
| 4,799,777 | 1/1989 | Edouard et al. | 350/358 |
| 4,872,746 | 10/1989 | Kobayashi | 350/358 |

FOREIGN PATENT DOCUMENTS

59-160128 9/1984 Japan .

Primary Examiner—Eugene R. LaRoche
Assistant Examiner—Michael B. Shingleton
Attorney, Agent, or Firm—Lowe, Price, LeBlanc & Becker

[57] ABSTRACT

An AOD driver (27) generates a driving signal of an AOD (11), whose frequency varies in response to a sweep signal and whose amplitude varies in accordance with an amplitude control signal. In an initial stage, a constant signal level is stored in a memory (29) and is supplied to the AOD driver. A laser beam is deflected by the AOD and the light intensity thereof is detected by a photo-sensor (14). A signal representing the light intensity is given to a CPU (33) and a corrected amplitude control signal is generated, which is stored in the memory in place of the original amplitude control signal to control the AOD driver.

20 Claims, 6 Drawing Sheets

METHOD OF AND APPARATUS FOR CONTROLLING DEFLECTION OF OPTICAL BEAMS

BACKGROUND OF THE INVENTION

1. Field of the Invention

The present invention relates to a method of and an apparatus for controlling deflection of an optical beam through an AOD (acousto-optic deflector), and more particularly, it relates to a deflection control for constantly maintaining diffraction efficiency of an AOD at any deflection angle.

2. Description of Prior Arts

An AOD is generally formed by an ultrasonic oscillator and an acoustic element, and an optical beam is incident upon the acoustic element. When the ultrasonic oscillator oscillates an ultrasonic wave toward the acoustic element, diffraction takes place in the acoustic element to output primary diffracted light. The outgoing angle (i.e., deflection angle) of the primary diffracted light depends on the frequency of the ultrasonic wave. Thus, the deflection angle of the outgoing light is varied with frequency change of the ultrasonic wave with time.

It is known that diffraction efficiency of such an AOD depends on the deflection angle. In other words, the intensity of outgoing light from the AOD is varied with the frequency of an ultrasonic wave deciding its deflection angle assuming that the intensity of incident light upon the AOD is constant. Therefore, the intensity of the outgoing light from the AOD is inevitably varied with the deflection angle if an ultrasonic wave having a constant amplitude is oscillated from the ultrasonic oscillator and the frequency thereof is changed. This causes a problem in scanning for exposing of a photosensitive material, such as a photosensitive film, since recorded density is varied with the scanning positions and constant image density cannot be obtained.

Japanese Patent Laying-Open Gazette No. 59-160128 discloses a technique for solving this problem. This technique is based on the fact that intensity of outgoing light from an AOD depends not only on the frequency, but also the amplitude of the ultrasonic wave, and corrects the intensity of the outgoing light, where the word "intensity of outgoing light" is used in the present specification under the condition that the intensity of light incident to an AOD is constant. The amplitude of the ultrasonic wave is proportionate to the power or amplitude of an input signal which is supplied to the ultrasonic oscillator. Thus, the power of the input signal is changed in response to the frequency of the ultrasonic wave (i.e., the frequency of the input signal), in order to attain the highest diffraction efficiency at each frequency value.

In this technique, a plurality of power levels are first set for the input signal to the ultrasonic oscillator, and the frequencies of the ultrasonic waves are changed at the respective power levels, thereby obtaining the relation between the frequency and diffraction efficiency. Then, relations between the frequencies obtained for the respective power levels and values of diffraction efficiency are compared with each other, to obtain power levels maximizing the values of diffraction efficiency at the respective frequencies. Thus, considerable time and labor is required since the relation between the frequency and the diffraction efficiency is obtained at every power level.

Further, since diffraction efficiency is also varied with environmental conditions such as the temperature of the AOD, it is necessary to also change the power of the input signal to the ultrasonic oscillator in order to constantly maintain the intensity of outgoing light from the AOD if the environmental conditions are changed. In the aforementioned technique, however, it has been difficult to finely adjust the power of the input signal in response to change in the environmental conditions since the power of the input signal to the ultrasonic oscillator has been corrected by a filter circuit.

SUMMARY OF THE INVENTION

The present invention is directed to a method of controlling an optical beam deflected by an acousto-optic deflector.

According to the present invention, the method comprises the steps of: (a) generating a periodic sweep signal whose level varies with time; (b) generating an amplitude control signal synchronized with the sweep signal; (c) generating a drive signal whose frequency and amplitude vary in response to the sweep signal and the amplitude control signal, respectively; (d) providing the drive signal to the acousto-optic deflector to thereby drive the acousto-optic deflector and obtain a deflected optical beam; (e) detecting light intensity of the deflected optical beam with a photo-sensor in synchronism with the sweep signal, to thereby obtain light intensity data representing dependence of the light intensity on the frequency; (f) correcting the amplitude control signal as a function of the light intensity data to obtain a corrected amplitude control signal; (g) generating the drive signal again while substituting the corrected amplitude control signal for the amplitude control signal; and (h) providing the drive signal generated in the step (g) to the acousto-optic deflector to thereby obtain the deflected optical beam with intensity corrected.

The step (b) may comprise the step of: (b-1) providing a predetermined constant level to the an amplitude control signal.

In generating the corrected amplitude control signal, a primary correction data is obtained for a time period in which the optical beam is substantially deflected by the acousto-optic deflector. The primary correction data is extrapolated to an exterior of the time period to obtain a secondary correction data.

The secondary correction data is written in and then read out from a memory to generate the corrected amplitude control signal, in which addresses of the memory allocated to the secondary correction data is shifted by a predetermined width of shift in order to compensate propagation delay of an ultrasonic wave in the AOD.

The present invention is also directed to an apparatus for controlling an optical beam deflected by an acousto-optic deflector.

According to the present invention, the apparatus comprises: (a) memory means holding predetermined amplitude control data; (b) means for generating a periodic sweep signal whose level varies with time; (c) means for generating an address signal representative of respective addresses of the memory means in synchronism with the periodic sweep signal; (d) means for reading the amplitude control data from the memory means to generate an amplitude control signal synchronized with the sweep signal; (e) driver means for receiving the sweep signal and the amplitude control signal and for generating a drive signal whose frequency and amplitude vary in response to the sweep signal and the amplitude control signal, respectively, wherein the drive signal is supplied to the acousto-optic deflector to drive the acousto-optic deflector and obtain a deflected optical beam; (f) photo-sensor means operable to detect light intensity of the deflected optical beam and to generate an intensity signal representing the light intensity; (g) means for receiving the intensity signal and the address signal to obtain light intensity data representing relationship between the light intensity and the respective addresses; (h) means for generating a corrected amplitude control signal as a function of the light intensity data and storing the corrected amplitude control signal in the addresses of the memory means in place of the predetermined amplitude control data; and (i) means for reading the corrected amplitude control signal from the memory means to deliver the corrected amplitude control signal to the driver means, in place of the amplitude control signal, thereby obtaining the deflected optical beam with intensity corrected.

The present invention also includes such a case that the amplitude of the AOD drive signal is constant regardless of the frequency thereof.

Accordingly, an object of the present invention is to provide a method of and an apparatus for controlling deflection of an optical beam, which can easily perform correction for constantly maintaining intensity of outgoing light from an AOD with no regard to its deflection angle.

These and other objects, features, aspects and advantages of the present invention will become more apparent from the following detailed description of the present invention when taken in conjunction with the accompanying drawings.

DESCRIPTION OF PREFERRED EMBODIMENTS

A. Structure and Operation of Apparatus

Figure 1:
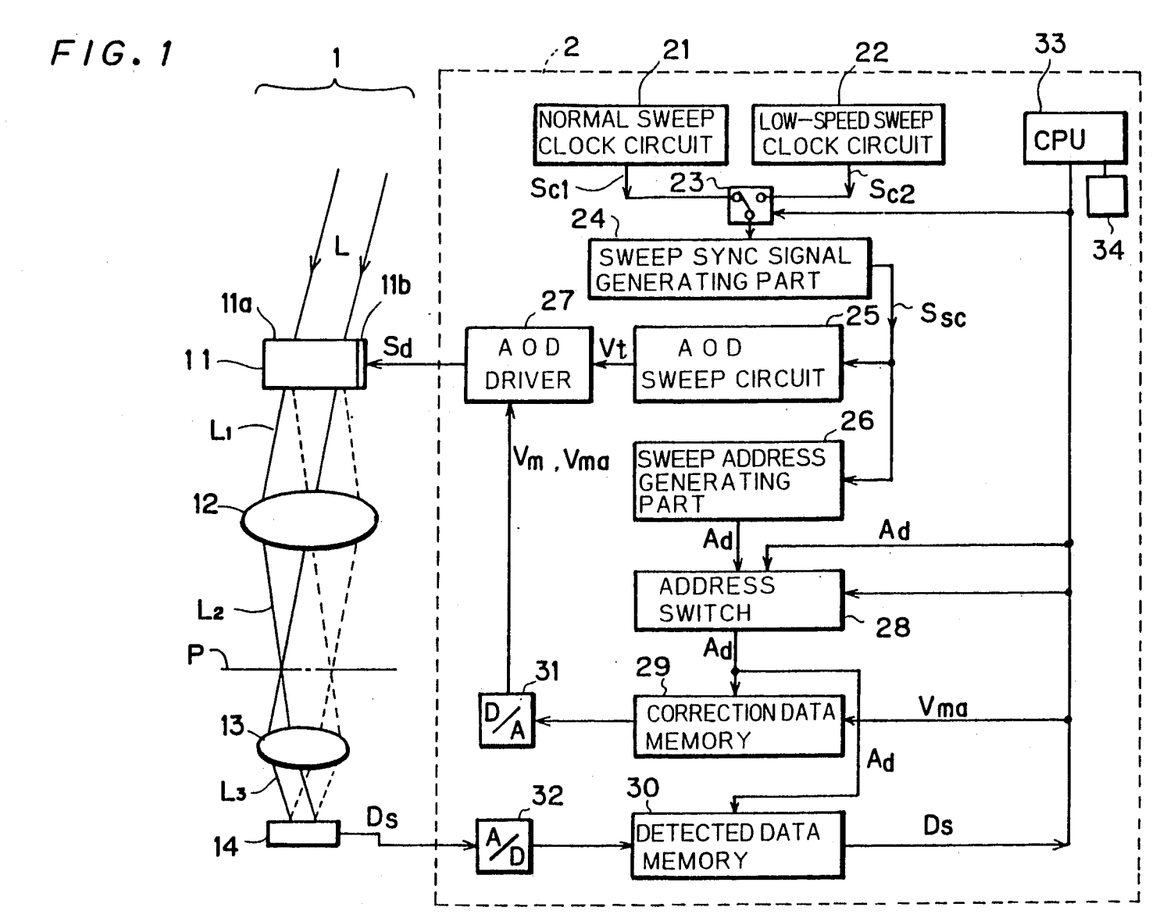
FIG. 1 is a schematic block diagram of an apparatus according to a preferred embodiment of the present invention.

FIG. 1 is a schematic block diagram showing an apparatus according to a preferred embodiment of the present invention, which may be employed in an image scanner such as a process scanner of a flat-bed type. This apparatus comprises an optical system 1 and an AOD control unit 2.

The optical system 1 comprises an AOD 11, a scan lens 12, a relay lens 13, and a light intensity sensor 14. The AOD 11 is formed by an acoustic element 11a and an ultrasonic oscillator 11b. Laser light L which is emitted from a laser oscillator (not shown) is deflected by the AOD 11, and thereafter passed through the scan lens 12 and the relay lens 13, to reach the light intensity sensor 14. The solid and broken lines typically express the beams of light in respective stages with symbols $L_1$, $L_2$ and $L_3$. The light intensity sensor 14 is installed on a rear focal position of the relay lens 13, and therefore, the position of a beam spot on the light intensity sensor 14 is not changed even if the outgoing light $L_1$ is deflected by the AOD 11. Thus, the light receiving plane of the light intensity sensor 14 can be advantageously reduced. Since the position of the beam spot is unmoved, further, difference in measurement sensitivity caused by positional difference on the light receiving plane of the light intensity sensor 14 can be advantageously neglected. Further, since the angle of incidence upon the light receiving plane of the light intensity sensor 14 is changed by deflection several times at the most, it is also possible to neglect difference in measurement sensitivity caused by the change in the deflection angle.

The location of the light intensity sensor 14 is not restricted to the aforementioned position, but the same can be installed in any position which can receive the whole of the outgoing light $L_1$.

A symbol P in FIG. 1 denotes a plane on which the deflected light forms an image, and a photosensitive material is provided on this plane P or a position which is optically equivalent to the plane P, when the apparatus is used for recording an image on the photosensitive material through scanning thereof.

The AOD control unit 2 is adapted to generate an AOD driving signal $S_d$, which serves as a control signal for the AOD 11. This AOD control unit 2 also has a function of producing correction data on the basis of detection data obtained by the light intensity sensor 14 when the laser light L is deflected by the AOD 11, and generating the AOD driving signal $S_d$ on the basis of the correction data so that the intensity of the outgoing light $L_1$ is constant regardless of the deflection angle on.

Figure 2A:
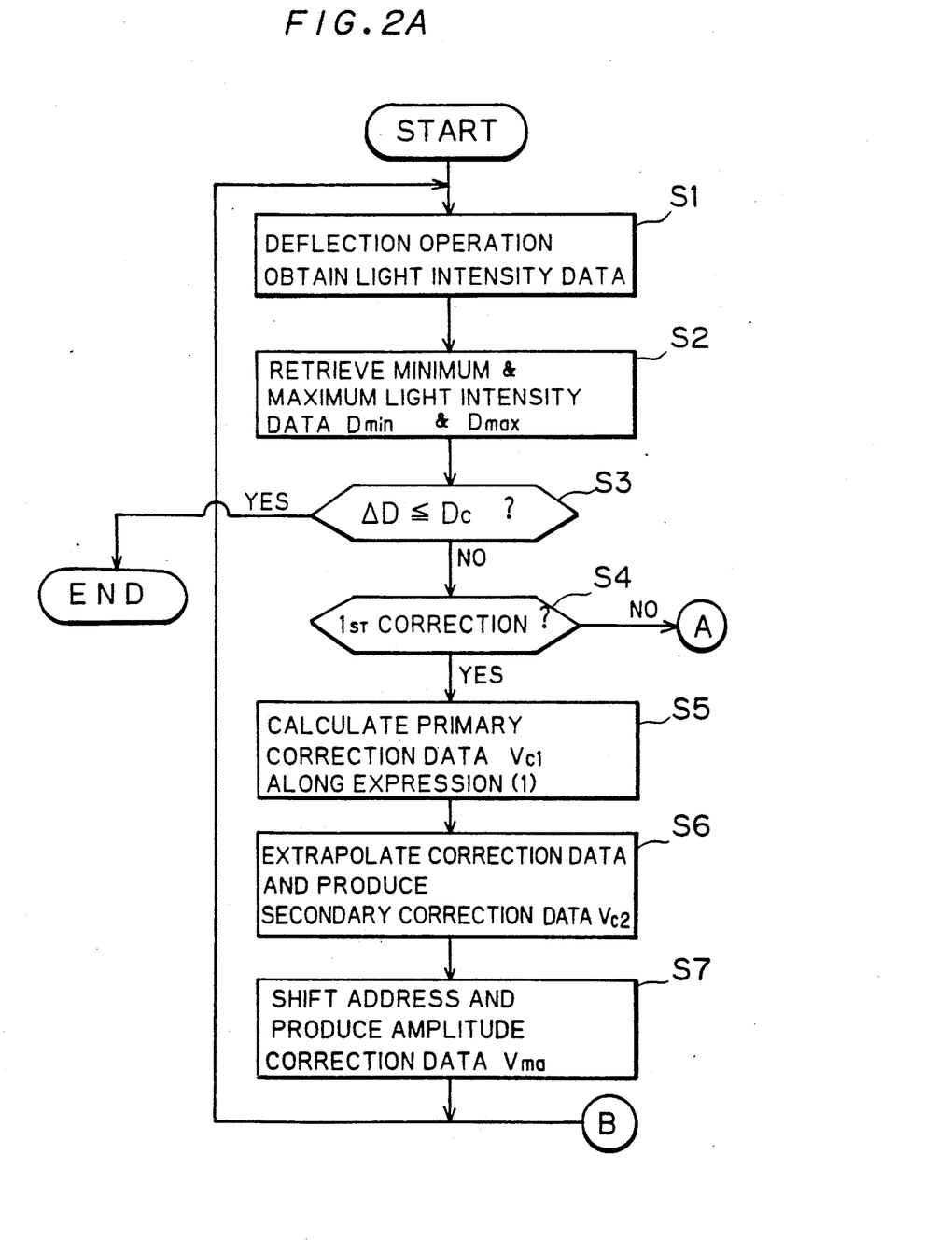
FIGS. 2A and 2B are flow charts showing the procedure of the preferred embodiment of the present invention.
Figure 2B:
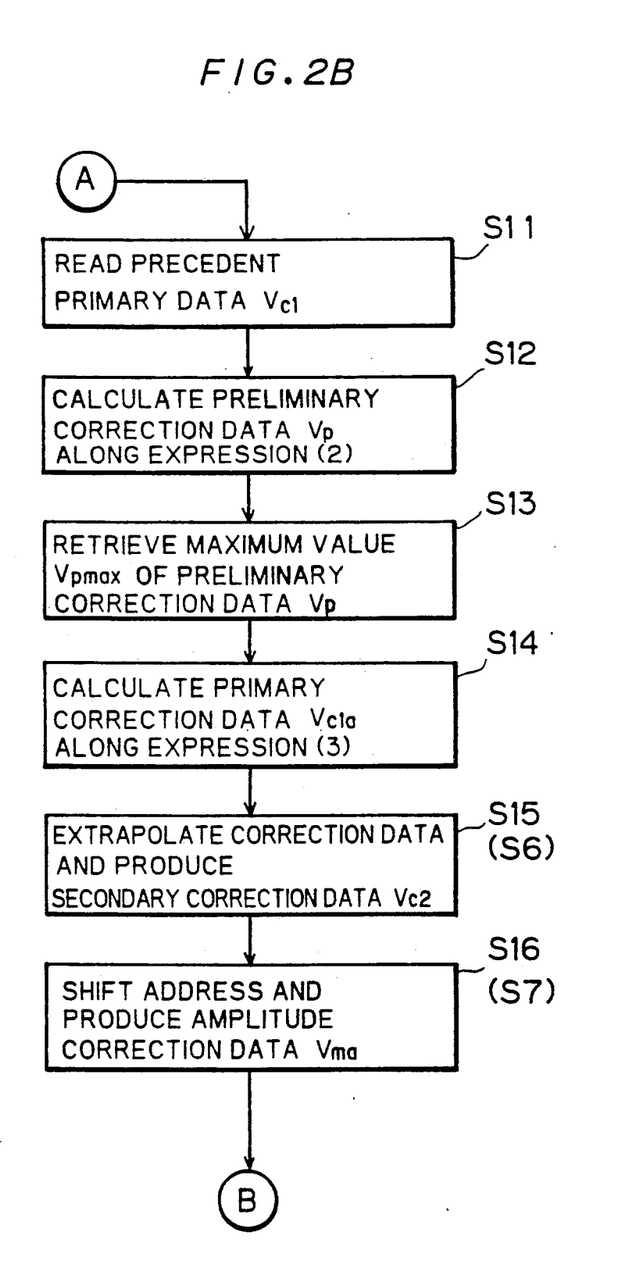
Figure 3A:
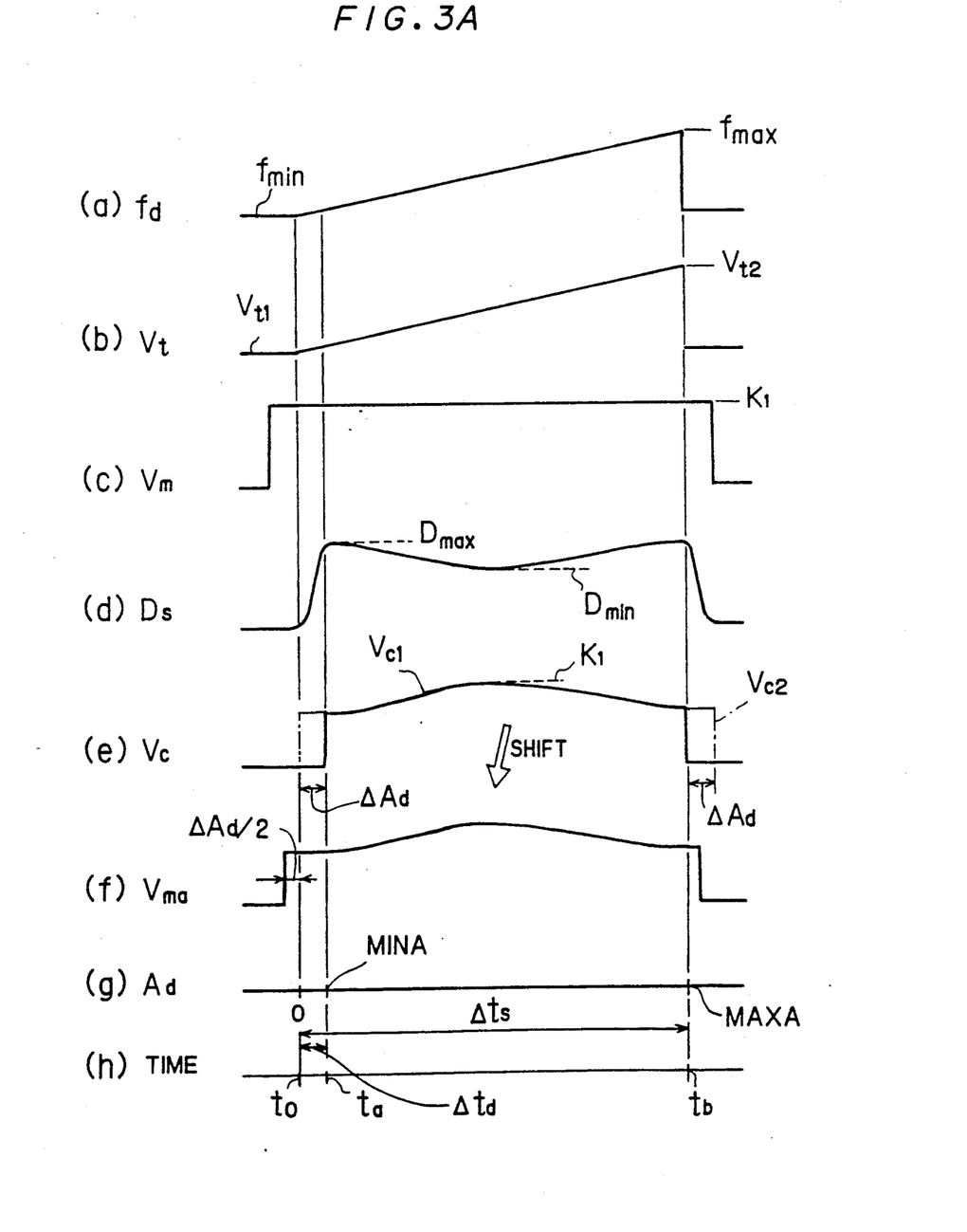
FIGS. 3A and 3B are timing charts showing signals and data employed in the preferred embodiment.
Figure 3B:
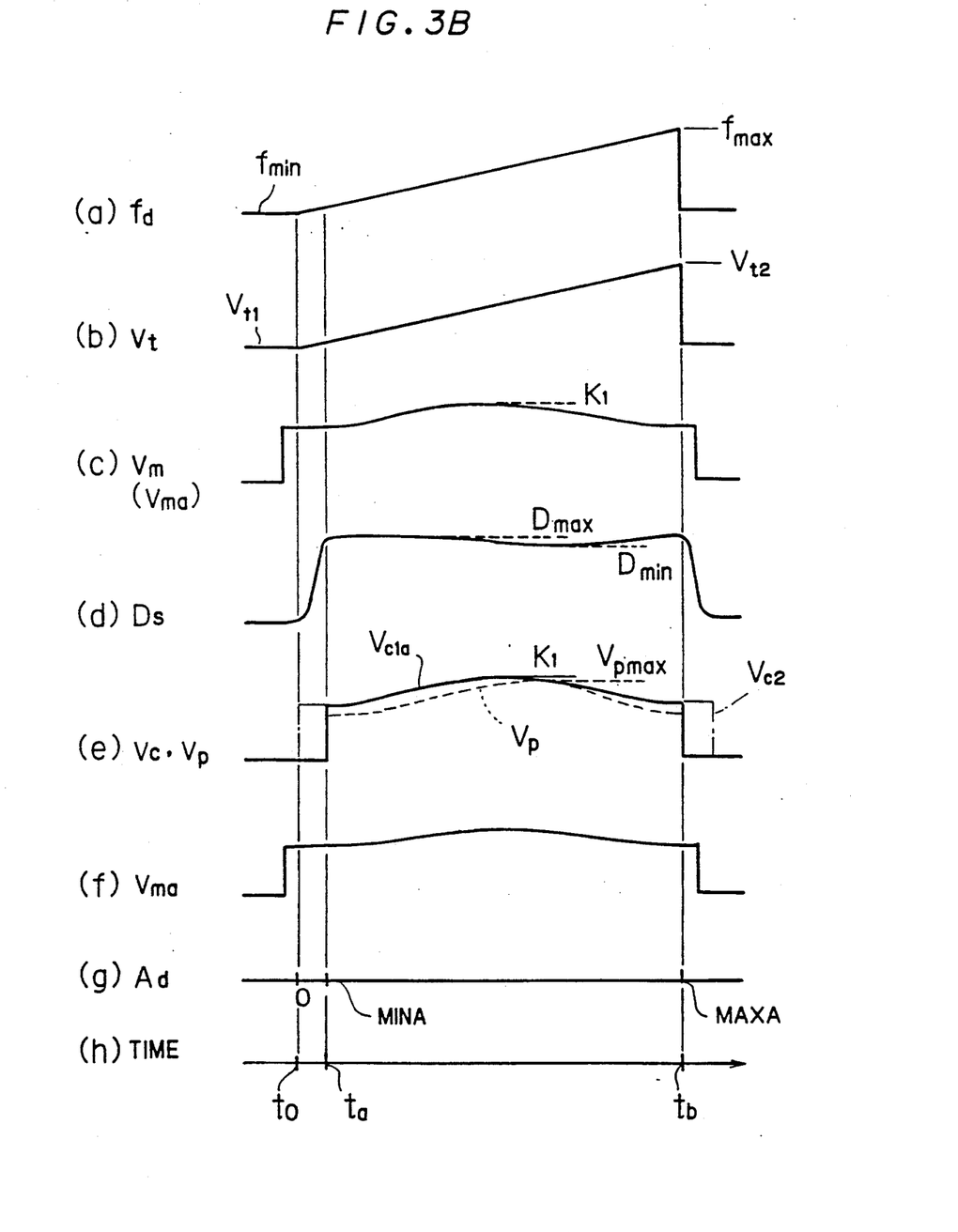

FIGS. 2A and 2B are flow charts showing the procedure of the preferred embodiment of the present invention. FIGS. 3A and 3B are timing charts showing signals used in the AOD control unit 2 in this procedure.

First, at a step S1, light intensity data $D_s$ is obtained by the light intensity sensor 14 while deflecting the outgoing light $L_1$ by the AOD 11.

The operation of the AOD control unit 2 in this step is as follows: First, a normal sweep clock circuit 21 supplies a normal sweep clock signal $S_{c1}$ to a sweep synchronizing signal generating part 24 through a switch circuit 23. The normal sweep clock signal $S_{c1}$ is a clock signal of 200 MHz, for example, and the sweep synchronizing signal generating part 24 divides the same into 1/10, to generate a sweep synchronizing signal $S_{sc}$ of 20 MHz. The AOD control unit 2 also comprises a low-speed sweep clock circuit 22, so that it is also possible to supply a low-speed sweep clock signal $S_{c2}$ generated by the low-speed sweep clock circuit 22 to the sweep synchronizing signal generating part 24 by switching the switch circuit 23 by an instruction from a CPU 33. Such a case is described later.

The sweep synchronizing signal generating part 24 supplies the sweep synchronizing signal $S_{sc}$ to an AOD sweep circuit 25 and a sweep address generating part 26. The AOD sweep circuit 25 generates a frequency control signal $V_t$, which is shown at FIG. 3A(b). This frequency control signal $V_t$ substantially linearly rises up with time and is periodic although only one cycle is shown in FIG. 3A(b). An AOD driver 27, which receives the frequency control signal $V_t$, may be formed by a VCO (voltage control oscillator) which controls frequencies by voltages, an amplitude controller which maintains the amplitude of its output constant, and an amplifier which amplifies the output of the amplitude controller, so that the AOD driver 27 generates the AOD driving signal $S_d$ having a frequency $f_d$ shown at FIG. 3A(a). The minimum and maximum values $f_{min}$ and $f_{max}$ of the frequency $f_d$ correspond to the lowest and highest levels $V_{t1}$ and $V_{t2}$ of the frequency control signal $V_t$ respectively.

On the other hand, the sweep address generating part 26 generates an address signal $A_d$ in response to the sweep synchronizing signal $S_{sc}$. FIG. 3A(g) shows an address value which is indicated by the address signal $A_d$. The address value $A_d$ at a time $t_0$ when the value of the frequency control signal $V_t$ starts to rise is "0", and the address value $A_d$ at a time $t_b$ when the value of the signal $V_t$ reaches the maximum value $V_{t2}$ is "MAXA" (hereinafter referred to as "effective maximum address"). The address value $A_d$ at a time $t_a$ after a lapse of a delay time $\Delta t_d$ of the AOD 11 from the time $t_0$ is "MINA" (hereinafter referred to as "effective minimum address"). The delay time $\Delta t_d$ is a time between starting of rise of the value of the frequency control signal $V_t$ and starting of actual change of the angle of the outgoing light $L_1$ from the AOD 11. This delay time $\Delta t_d$ depends on a time required for propagation of an ultrasonic wave from the ultrasonic oscillator 11b to the acoustic element 11a.

The sweep address generating part 26 supplies the address signal $A_d$ to a correction data memory 29 through an address switching circuit 28. The function of the address switching circuit 28 is further described later.

The correction data memory 29 stores data (hereinafter referred to as "amplitude correction data") indicating the level of an amplitude control signal $V_m$ to be supplied to the AOD driver 27, and provides the level to the amplitude control signal $V_m$ in response to the address signal $A_d$. Since diffraction efficiency is varied with the amplitude of the AOD driving signal $S_d$, the amplitude control signal $V_m$ is adapted to adjust the diffraction efficiency of the AOD 11.

FIG. 3A(c) shows the amplitude correction data (i.e., amplitude control signal) $V_m$ which is employed for performing first correction. The amplitude correction data $V_m$ is maintained at a prescribed target maximum correction value $K_1$ during times $t_0$ to $t_b$ when a sweep is performed. The target maximum correction value $K_1$ is a voltage value which is so expected as to maximize the diffraction efficiency of the AOD 11.

The amplitude correction signal $V_m$ outputted from the correction data memory 29 as a digital signal is converted into an analog signal by a D-A converter 31 and supplied to the AOD driver 27.

The AOD driver 27 receives the frequency control signal $V_t$ and the amplitude control signal $V_m$, and generates the AOD driving signal $S_d$ which has a frequency and an amplitude responsive thereto.

When the AOD driver 27 thus supplies the AOD driving signal $S_d$ to the ultrasonic oscillator 11b of the AOD 11, the outgoing light $L_1$ from the AOD 11 is deflected. When the deflected outgoing light $L_1$ is collected on the light receiving plane of the light intensity sensor 14 through the scan lens 12 and the relay lens 13, the light intensity sensor 14 generates light intensity data $D_s$ thereof. The light intensity data $D_s$ is converted into a digital signal by an A-D converter 32 in the AOD control unit 2, and thereafter inputted in a detected data memory 30. The detected data memory 30 stores the light intensity data $D_s$ in deflection operation while making the same correspond to the address signal $A_d$ received from the sweep address generating part 26 through the address switching circuit 28.

FIG. 3A(d) shows the light intensity data $D_s$ thus obtained. In the first deflection operation, the value of the light intensity data $D_s$ is changed in a considerable width in the single deflection operation since the diffraction efficiency is not substantially corrected in response to the deflection angle.

Thus, the light intensity data $D_s$ of the outgoing light $L_1$ responsive to the change of the deflection angle (i.e., frequency) is obtained at the step S1. The light intensity data $D_s$ shown at FIG. 3A(d) may alternatively be obtained by averaging data obtained by performing the deflection operation several times. In this case, it is possible to advantageously reduce influence by noises which are generated from the light intensity sensor 14 at random, for example.

Steps S2 to S7 are processes executed by the CPU 33 in its interior.

At the step S2, the minimum value $D_{min}$ (hereinafter referred to as "minimum light intensity value") and the maximum value $D_{max}$ (hereinafter referred to as "maximum light intensity value") of the light intensity data $D_s$ stored in the detected data memory 30 are retrieved. Such retrieval is performed with respect to the light intensity data $D_s$ between the effective minimum address MINA and the effective maximum address MAXA.

At the step S3, difference $\Delta D$ (hereinafter referred to as "light intensity difference") between the maximum light intensity value $D_{max}$ and the minimum light intensity value $D_{min}$ is calculated and is compared with a prescribed allowable value $D_c$. If the light intensity difference $\Delta D$ is less than the allowable value $D_c$, the process is terminated since the light intensity data $D_s$ is substantially constant regardless of the deflection angle. If the light intensity difference $\Delta D$ is greater than the allowable value $D_c$, on the other hand, the following step S4 and those subsequent thereto are carried out:

At the step S4, a determination is made as to whether or not this is the first correction. The step S5 and those subsequent thereto are carried out in the first correction, while a step S11 and those subsequent thereto are carried out in second or later correction.

At the step S5, primary correction data $V_{c1}$ for correcting the diffraction efficiency is calculated for every address $A_d$ in accordance with the following expression (1), on the basis of the minimum light intensity value $D_{min}$ and the light intensity data $D_s(A_d)$ at each address $A_d$:

$$V_{c1}(A_d) = K_1 \cdot D_{min}/D_s(A_d) \qquad (1)$$

FIG. 3A(e) shows primary correction data $V_{c1}$ thus obtained in a solid line. The primary correction data $V_{c1}$ forms the basis of new amplitude correction data $V_{ma}$ shown at FIG. 3A(f) to be stored in the correction data memory 29. Principal difference between the primary correction data $V_{c1}$ and the amplitude correction data $V_{ma}$ resides in that the addresses thereof are shifted from each other, as hereinafter described. Namely, the configurations of these data are substantially equal to each other. The expression (1) is based on such a supposition that the voltage level of the amplitude correction signal $V_m$ (i.e., the amplitude of the AOD driving signal $S_d$) and the diffraction efficiency of the AOD 11 are substantially proportionate to each other at each address $A_d$. The light intensity data $D_s$ is proportionate to the diffraction efficiency at each address $A_d$, and hence, if the level of the new amplitude correction signal $V_{ma}$ corresponding to the primary correction data $V_{c1}$ in the expression (1) is made inversely proportional to the light intensity data $D_s$ as in the expression (1), it is expected that the light intensity of the outgoing light $L_1$ deflected on the basis of the amplitude correction signal $V_{ma}$ becomes constant regardless of the deflection angle. As understood from the expression (1), the maximum value of the primary correction data $V_{c1}$ is equal to the target maximum correction value $K_1$ (see FIG. 3A(e)). Further, the primary correction data $V_{c1}$ is obtained between the effective minimum address MINA and the effective maximum address MAXA. This is because substantial deflection is made only in addresses in this range, and reliable light intensity data $D_s$ are also restricted in this address range.

At the step S6, secondary correction data $V_{c2}$ is produced by extrapolating the primary correction data $V_{c1}$ to addresses smaller than the effective miminum address MINA and those higher than the effective maximum address MAXA. FIG. 3A(e) shows parts of the secondary correction data $V_{c2}$ added by extrapolation in one-dot chain lines. The extrapolated addresses in each side are in a range of an address width $\Delta A_d$ ($=$MINA) corresponding to the delay time $\Delta t_d$ of the AOD 11. The value of correction data extrapolated in the address range 0 to MINA is equal to the value of the primary correction data $V_{c1}$ at the effective minimum address MINA. The value of correction data extrapolated in the address range MAXA to (MAXA+$\Delta A_d$) is equal to the value of the primary correction data $V_{c1}$ at the effective maximum address MAXA. The correction data are thus extrapolated so that the value of the amplitude correction data $V_{ma}$ in the address range 0 to MAXA is not zeroed when the addresses of the second correction data $V_{c2}$ are shifted in order to obtain new amplitude correction data $V_{ma}$ at the next step S7. Assuming that the value of the amplitude data $V_{ma}$ in the address range 0 to MAXA is zeroed, the amplitude of the AOD driving signal $S_d$ is zeroed in this part and the AOD 11 inconveniently performs no deflection operation.

At the step S7, the new amplitude correction data $V_{ma}$ is produced by shifting the address of the secondary correction data $V_{c2}$ by a half $\Delta A_d/2$ of the address width $\Delta A_d$ corresponding to the delay time $\Delta t_d$ of the AOD 11 (see FIG. 3A(f)). This shifting is made in a direction for substantially reducing the address of the correction data.

Figure 4:
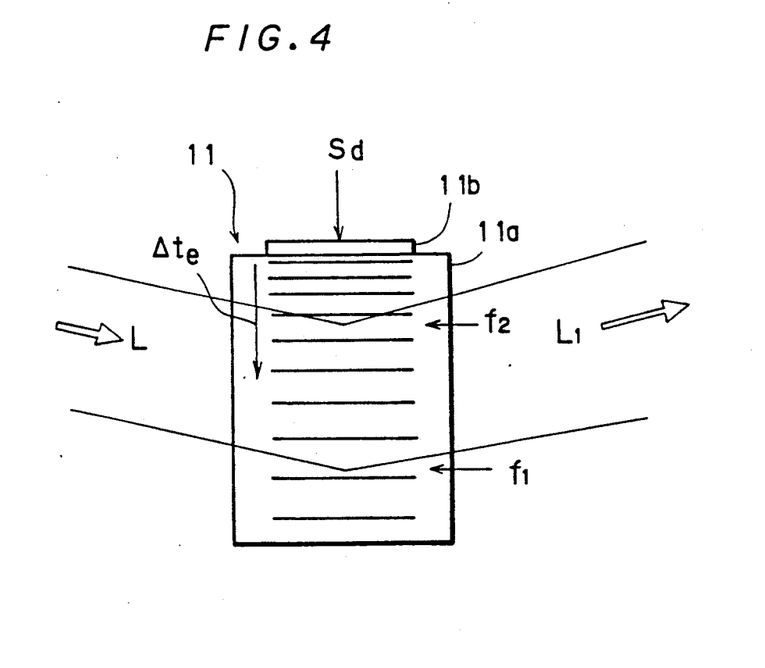
FIG. 4 is a conceptual diagram showing an operating state of an AOD.

The width $\Delta A_d/2$ for shifting the address is determined in consideration of the following phenomenon: There is a certain degree of time deviation between change of the frequency $f_d$ of the ultrasonic waves controlled by the AOD driving signal $S_d$ and change of the light intensity data $D_s$ corresponding thereto. FIG. 4 is a conceptual diagram showing the deflection operation in the AOD 11. Referring to FIG. 4, an ultrasonic wave propagated in the acoustic element 11a is typically shown by parallel lines. The frequency $f_d$ of the AOD driving signal $S_d$ supplied to the ultrasonic oscillator 11b is linearly increased with time, as shown at FIG. 3A(a). Since the frequency $f_d$ is quickly changed in normal sweep operation (deflection operation), ultrasonic waves being in a certain degree of frequency range commonly exist in the acoustic element 11a, as shown in FIG. 4. Namely, in the instance shown in FIG. 4, the outgoing light $L_1$ is deflected by ultrasonic waves of a frequency range $f_1$ to $f_2$ ($f_1 < f_2$). The current deflection angle corresponds to an average frequency of the frequency range $f_1$ to $f_2$. Regarding the average frequency as being correspondent to an ultrasonic wave at the central part of the acoustic element 11a, it is conceivable that the outgoing light $L_1$ is deflected with a delay by a time $\Delta t_e$ between generation of the ultrasonic wave from the ultrasonic oscillator 11b and reaching of the ultrasonic wave to the central part of the acoustic element 11a. Therefore, light intensity data $D_s$ obtained in a certain instance corresponds to an ultrasonic wave which has been generated in advance of the instance by the time $\Delta t_e$. Thus, shifting may be made by an address width corresponding to the time $\Delta t_e$, in order to obtain the amplitude correction data $V_{ma}$. On the other hand, it is also possible to regard the delay time $\Delta t_d$ of the AOD 11 as a time which is required for an ultrasonic wave generated from the ultrasonic oscillator 11b to reach an end portion of the acoustic element 11a. Therefore, the shifted address width is assumed to be half the address width $\Delta A_d$ corresponding to the AOD delay time $\Delta t_d$.

There may be such a case that it is better to use the address width $\Delta A_d$ corresponding to the AOD delay time $\Delta t_d$ itself as the shifted address width. Alternatively, amplitude correction data for minimizing light intensity difference $\Delta D$ ($=D_{max}-D_{min}$) may be obtained by changing the shifted address width to various values for obtaining a plurality of amplitude correction data $V_{ma}$ and making the AOD 11 perform deflection operation through the respective ones thereof.

The CPU 33 writes the amplitude correction data $V_{ma}$ obtained in the aforementioned manner in the correction data memory 29. At this time, the address switching circuit 28 is switched in accordance with a command from the CPU 33, so that the address $A_d$ outputted from the CPU 33 is supplied to the correction data memory 29 through the address switching circuit 28.

The primary correction data $V_{c1}$ obtained in the first correction as described above is stored in a memory 34, which is connected to the CPU 33, to be used for second correction.

After termination of the step S7, the process is returned to the step S1, in order to obtain current light intensity data $D_s$ by performing the deflection operation again. At this time, the correction data memory 29 supplies the amplitude correction signal $V_{ma}$ to the AOD driver 27 on the basis of the amplitude correction data $V_{ma}$ obtained in the first correction. FIG. 3B shows signals and data employed in the second correction.

The steps S2 and S3 are carried out similarly to the first correction. If the light intensity of the outgoing light $L_1$ has become substantially constant regardless of the frequency $f_d$ by the first correction, the correction is terminated at the step S3. However, the light intensity data $D_s$ may not become substantially constant even if the AOD 11 is controlled on the basis of the corrected amplitude correction data $V_{ma}$. If the light intensity difference $\Delta D$ is greater than the allowable value $D_c$ at the step S3, the process is advanced from the step S4 to the step S11, to correct the amplitude correction data $V_{ma}$ again.

At the step S11, the CPU 33 reads the primary correction data $V_{c1}$ obtained in the preceding (first) correction from the memory 34.

At a step S12, preliminary correction data $V_p$ is obtained on the basis of the following expression (2):

$$V_p(A_d) = V_{c1}(A_d) \cdot D_{min}/D_s(A_d) \quad (2)$$

where $V_p(A_d)$: preliminary correction data at the address $A_d$ $V_{c1}(A_d)$: primary correction data in preceding correction at the address $A_d$ $D_{min}$: currently obtained minimum light intensity value $D_s(A_d)$: light intensity data obtained in current correction at the address $A_d$ FIG. 3B(e) shows the preliminary correction data $V_p$ in a broken line. The preliminary correction data $V_p$ is calculated in a range between the effective minimum address MINA and the effective maximum address MAXA. As understood from FIG. 3B(e) and the expression (2), the maximum value $V_{pmax}$ of the preliminary correction data $V_p$ may not reach the target maximum correction value $K_1$.

Thus, the maximum value $V_{pmax}$ of the preliminary correction data $V_p$ is first retrieved at a step S13. At a step S14, such primary data $V_{c1a}$ that the maximum value is equal to the target maximum correction value $K_1$ is calculated in accordance with the following expression (3):

$$V_{c1a}(A_d) = K_1 \cdot V_p(A_d)/V_{pmax} \quad (3)$$

The new primary correction data $V_{c1a}$ corresponds to the primary correction data $V_{c1}$ (see FIG. 3A(e)) obtained in the first correction.

After the new primary correction data $V_{c1a}$ is thus obtained, steps S15 and S16, which are equal to the aforementioned steps S6 and S7 respectively, are carried out, thereby producing amplitude correction data $V_{ma}$ shown at FIG. 3B(f).

After the step S16 is terminated, the process is returned to the step S1 again. The steps S1 to S4 and S11 to S16 are repeatedly carried out until the light intensity difference $\Delta D$ becomes less than the allowable value $D_c$ at the step S3. Thus, obtained is the amplitude correction data $V_{ma}$ for controlling the AOD 11 so that the light intensity is substantially constant regardless of the deflection angle.

After the amplitude correction data $V_{ma}$ is finally obtained, a prescribed optical system formed by an objective lens and a scanning plane on which a photosensitive material is held, for example, is arranged in place of the light intensity sensor 14 and the AOD 11 is controlled in the aforementioned manner, so that the photosensitive material can be scanned with a constant light intensity value.

B. Another Embodiment

The above embodiment has been described with reference to such a case that the frequency $f_d$ is quickly changed and ultrasonic waves being in a certain degree of frequency range commonly exist in the acoustic element 11a of the AOD 11.

In a second embodiment of the present invention, amplitude correction data $V_{ma}$ is obtained through such quasistatic frequency change that the frequency $f_d$ is sufficiently slowly changed and the frequency of the ultrasonic wave in the acoustic element 11a can be regarded substantially as uniform.

In this case, the switch circuit 23 is switched in the AOD control unit 2 shown in FIG. 1 in accordance with a command from the CPU 33. Consequently, the low-speed sweep clock circuit 22 supplies a low-speed sweep clock signal $S_{c2}$ to the sweep synchronizing signal generating part 24. The frequency of the low-speed sweep clock signal $S_{c2}$ is determined as follows, for example: In order to implement the aforementioned quasistatic frequency change, a time $\Delta t_k$ for holding each sweep address $A_d$ is made at least equal to a time in which each ultrasonic wave goes across the beam diameter of incident light L in the AOD 11:

$$\Delta t_k = D_l/v \quad (4)$$

where $\Delta t_k$: holding time of the address $A_d$ $D_l$: beam diameter of the incident light in the AOD $v$: sound speed in the AOD.

When the address $A_d$ is changed from zero to MAXA in a single sweep, a single sweep time $\Delta t_s$ (see FIG. 3A(h)) is expressed as follows:

$$\Delta t_s = MAXA \cdot \Delta t_k$$

Assuming that MAXA = 1024, $D_l$ = 10 mm and v = 650 m/s, $\Delta t_s$ = 15.8 ms. If a normal sweep time is 70 μs, for example, a low-speed sweep is made at a sweep rate of about 1/225 of the normal sweep speed. If the normal sweep clock signal $S_{c1}$ is prepared by a clock signal of 200 MHz, a clock signal of about 1 MHz may be employed as the low-speed sweep clock signal $S_{c2}$.

When the light intensity data $D_s$ is obtained by using such a low-speed sweep clock signal $S_{c1}$, there is no time deviation between the change of the light intensity data $D_s$ and that of the frequency $f_d$, dissimilarly to the above. Thus, no address shifting is required at the steps S7 and S16 in the aforementioned procedure. Further, the steps S6 and S15, which have been carried out for executing the steps S7 and S16 respectively, are not required either. Thus, data processing for obtaining the amplitude correction data $V_{ma}$ is advantageously simplified by quasistatically changing the frequency.

Also when the amplitude correction data $V_{ma}$ is obtained by quasistatically changing the frequency, a sweep may be performed at a normal high sweep rate, in order to actually deflect the outgoing light $L_1$ for recording images.

In the aforementioned embodiment, the primary correction data $V_{c1}$ or the preliminary correction data $V_p$ has been assumed to be in inverse proportion to the light intensity data $D_s$, as shown in the expression (1) or (2). In place of this, the primary correction data $V_{c1}$ or the preliminary correction data $V_p$ may alternatively be obtained through a prescribed function which is related to the light intensity data $D_s$. A linear function, a square function or higher power function of an inverse number $1/D_s$ of the light intensity data $D_s$ etc. may be employed as the prescribed function.

According to the present invention, as hereinabove described, a signal having a frequency which is changed with time and an amplitude which has prescribed frequency dependency is employed as the control signal for deflecting the optical beam and the frequency dependency of the control signal is corrected on the basis of frequency dependency of current light intensity. Therefore, it is possible to easily correct the control signal so that the light intensity at each frequency is substantially constant.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A method of controlling an optical beam deflected by an acousto-optic deflector, said method comprising the steps of:
   (a) generating a periodic sweep signal whose level varies with time;
   (b) generating an amplitude control signal synchronized with said sweep signal;
   (c) generating a drive signal whose frequency and amplitude vary in response to said sweep signal and said amplitude control signal, respectively;
   (d) providing said drive signal to said acousto-optic deflector to thereby drive said acousto-optic deflector to thereby drive said acousto-optic deflector and obtain a deflected optical beam;
   (e) detecting light intensity of said deflected optical beam with a photo-sensor in synchronism with said sweep signal, to thereby obtain light intensity data representing dependence of said light intensity on said frequency;
   (f) correcting said amplitude control signal as a function of a reference light intensity value to obtain a corrected amplitude control signal, said reference light intensity value retrieved within said light intensity data;
   (g) generating said drive signal again while substituting said corrected amplitude control signal for said amplitude control signal; and
   (h) providing said drive signal generated in the step (g) to said acousto-optic deflector to thereby obtain said deflected optical beam with intensity corrected.

2. The method of claim 1, wherein the step (b) comprises the step of:
   (b-1) providing a predetermined constant level to said an amplitude control signal.

3. The method of claim 2, wherein the step (f) comprises the steps of:
   (f-1) obtaining a minimum light intensity $D_{min}$ in said light intensity data;
   (f-2) obtaining primary correction data $V_{c1}$ through the following equation (Eq. 1);

$$V_{c1} = K_1 \cdot D_{min}/D_s \qquad \text{(Eq. 1)}$$

where:
   $K_1$ is said predetermined constant level; and
   $D_s$ is said light intensity data; and
   (f-3) obtaining said corrected amplitude control signal from said primary correction data $V_{c1}$.

4. The method of claim 3, wherein the step (f-2) comprises the step of:
   (f-2-1) obtaining said primary correction data $V_{c1}$ for a time period in which said optical beam is substantially deflected by said acousto-optic deflector; and
   the step (f-3) comprises the step of:
   (f-3-1) extrapolating said primary correction data $V_{c1}$ to an exterior of said time period to obtain a secondary correction data.

5. The method of claim 4, wherein the step (f-3) further comprises the steps of:
   (f-3-2) allocating addresses of a memory to respective values of said secondary correction data;
   (f-3-3) shifting said addresses of said secondary correction data by a predetermined width of shift;
   (f-3-4) writing said secondary correction data in said addresses of said memory shifted in the step (f-3-3); and
   (f-3-5) reading said secondary correction data from said addresses of said memory shifted in the step (f-3-3) to generate said corrected amplitude control signal.

6. The method of claim 5, wherein the step (f-3-3) comprises the step of:
   shifting said addresses of said secondary correction data by a width of shift proportional to a propagation delay time of an ultrasonic wave in said acousto-optic deflector.

7. The method of claim 6, wherein said width of shift is $\Delta A_d/2$, where $\Delta A_d$ is an address width corresponding to a propagation delay time of an ultrasonic wave in said acousto-optic deflector.

8. The method of claim 3, further comprising the steps of:
   (i) obtaining a maximum light intensity in said light intensity data;
   (j) calculating a difference between said maximum and said minimum light intensities;
   (k) comparing said difference with a predetermined threshold value; and
   (l) when difference is larger than said threshold value, repeating the steps (a) through (f) until said difference becomes smaller than said threshold value.

9. The method of claim 8, wherein the step (f) in the repetition step (l) comprises the steps of;
   (f-1) obtaining preliminary correction data $V_p$ through the following equation (Eq. 2);

$$V_p = V_{c1} \cdot D_{min}/D_s \qquad \text{(Eq. 2)}$$

and
   (f-2) obtaining said corrected amplitude control signal from said preliminary correction data $V_{c1}$.

10. The method of claim 9, wherein the step (f) in the repetition step (l) further comprises the steps of;
    (f-3) obtaining a maximum value $V_{pmax}$ of said preliminary correction data $V_p$;
    (f-4) obtaining a new primary correction data $V_{c1a}$ through the following equation (Eq. 3);

$$V_{c1a} = K_1 \cdot V_p/V_{pmax} \qquad \text{(Eq. 3)}$$

and
    (f-5) obtaining said corrected amplitude control signal from said new primary correction data $V_{c1a}$.

11. The method of claim 10, wherein the step (f-4) comprises the step of:
    (f-4-1) obtaining said new primary correction data $V_{c1a}$ for a time period in which said optical beam is substantially deflected by said acousto-optic deflector; and
    the step (f-5) comprises the step of:
    (f-5-1) extrapolating said new primary correction data $V_{c1a}$ to an exterior of said time period to obtain a secondary correction data.

12. The method of claim 11, wherein the step (f-5) further comprises the steps of:

(f-5-2) storing said secondary correction data in predetermined addresses in a memory;

(f-5-3) shifting said addresses of said secondary correction data in said memory by a predetermined width of shift; and (f-5-4) reading said secondary correction data from addresses shifted in said memory to generate said corrected amplitude control signal.

13. The method of claim 12, wherein the step (f-5-3) comprises the step of:

shifting said addresses of said secondary correction data by a width of shift proportional to a propagation delay time of an ultrasonic wave in said acousto-optic deflector.

14. The method of claim 13, wherein said width of shift is $\Delta A_d/2$, where $\Delta A_d$ is an address width corresponding to a propagation delay time of an ultrasonic wave in said acousto-optic deflector.

15. An apparatus for controlling an optical beam deflected by an acousto-optic deflector, comprising:

(a) memory means holding predetermined amplitude control data;

(b) means for generating a periodic sweep signal whose level varies with time;

(c) means for generating an address signal representative of respective addresses of said memory means in synchronism with said periodic sweep signal;

(d) means for reading said amplitude control data from said memory means to generate an amplitude control signal synchronized with said sweep signal;

(e) driver means for receiving said sweep signal and said amplitude control signal and for generating a drive signal whose frequency and amplitude vary in response to said sweep signal and said amplitude control signal, respectively, wherein said drive signal is supplied to said acousto-optic deflector to drive said acousto-optic deflector and obtain a deflected optical beam;

(f) photo-sensor means operable to detect light intensity of said deflected optical beam and to generate an intensity signal representing said light intensity;

(g) means for receiving said intensity signal and said address signal to obtain light intensity data representing relationship between said light intensity and said respective addresses;

(h) means for generating a corrected amplitude control signal as a function of a reference light intensity value and storing said corrected amplitude control signal in said addresses of said memory means in place of said predetermined amplitude control data said reference light intensity value being retrieved within said light intensity; and (i) means for reading said corrected amplitude control signal from said memory means to deliver said corrected amplitude control signal to said driver means, in place of said amplitude control signal, thereby obtaining said deflected optical beam with intensity corrected.

16. The apparatus of claim 15, wherein said memory means holds a predetermined constant level as said predetermined amplitude control data.

17. The apparatus of claim 16, wherein said means (h) comprises:

(h-1) means for obtaining a minimum light intensity $D_{min}$ in said light intensity data;

(h-2) means for obtaining primary correction data $V_{c1}$ through the following equation (Eq. 1);

$$V_{c1} = K_1 \cdot D_{min}/D_s \qquad \text{(Eq. 1)}$$

where:

$K_1$ is said predetermined constant level; and $D_s$ is said light intensity data; and (h-3) means for obtaining said corrected amplitude control signal from said primary correction data $V_{c1}$.

18. The apparatus of claim 17, wherein said means (h-2) comprises:

(h-2-1) means for obtaining said primary correction data $V_{c1}$ for a time period in which said optical beam is substantially deflected by said acousto-optic deflector; and said means (h-3) comprises:

(h-3-1) means for extrapolating said primary correction data $V_{c1}$ to an exterior of said time period to obtain a secondary correction data.

19. The apparatus of claim 18, wherein said means further comprises:

(h-3-2) means for allocating said addresses in said memory means to said secondary correction data;

(h-3-3) means for shifting said addresses of said secondary correction data in said memory by a predetermined width of shift;

(h-3-4) means for writing said secondary correction data in addresses shifted in said memory shifted by said means (h-3-3); and (h-3-5) means for reading said secondary correction data from said memory to generate said corrected amplitude control signal.

20. The apparatus of claim 15, wherein said means (b) comprises:

(b-1) means for generating said periodic sweep signal whose level varies with time at a predetermined rate;

and wherein said predetermined rate is such that said address signal generated by the means (c) maintains respective address values at least a time period $\Delta t_k$ which is determined by the following equation (Eq. 4):

$$\Delta t_k = D_l/v \qquad \text{(Eq. 4)}$$

where:

$D_l$ is a diameter of said optical beam in said acousto-optic deflector; and $v$ is a speed of an ultrasonic wave in said acousto-optic deflector.

* * * * *